(12) United States Patent
Cheng

(10) Patent No.: US 11,463,562 B2
(45) Date of Patent: Oct. 4, 2022

(54) HINGE AND MOBILE TERMINAL

(71) Applicant: VIVO MOBILE COMMUNICATION CO., LTD., Guangdong (CN)

(72) Inventor: Dongcun Cheng, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/102,145

(22) Filed: Nov. 23, 2020

(65) Prior Publication Data

US 2021/0075895 A1 Mar. 11, 2021

Related U.S. Application Data

(63) Continuation of application No. PCT/CN2019/085989, filed on May 8, 2019.

(30) Foreign Application Priority Data

May 24, 2018 (CN) .......................... 201810510404.3

(51) Int. Cl.
*H04M 1/02* (2006.01)
(52) U.S. Cl.
CPC ....... *H04M 1/0216* (2013.01); *H04M 1/0268* (2013.01)
(58) Field of Classification Search
CPC .. H04M 1/0216; H04M 1/0268; H04M 1/026; H04M 1/0214; H04M 1/022;
(Continued)

(56) References Cited

U.S. PATENT DOCUMENTS

| 10,070,546 B1 * | 9/2018 | Hsu .................... H04M 1/0268 |
| 2009/0061964 A1 | 3/2009 | Kim et al. |
| 2015/0131222 A1 | 5/2015 | Kauhaniemi et al. |

(Continued)

FOREIGN PATENT DOCUMENTS

| CN | 104637408 A | 5/2015 |
| CN | 105605084 A | 5/2016 |

(Continued)

OTHER PUBLICATIONS

Chinese Office Action issued in corresponding application No. 201810510404.3, dated Feb. 3, 2020.

(Continued)

*Primary Examiner* — Lester G Kincaid
*Assistant Examiner* — Maryam Soltanzadeh
(74) *Attorney, Agent, or Firm* — Maschoff Brennan

(57) ABSTRACT

The present disclosure provides a hinge and a mobile terminal. The hinge includes at least two joints and a flexible connection member. The at least two joints are sequentially connected. Each joint includes a joint body, a rotation structure provided at a first end portion of the joint body and a support portion provided at a second end portion of the joint body. The first end portion and the second end portion are oppositely disposed. The rotation structures of any adjacent two joints are socketed with each other; the rotation structures of adjacent two joints are capable of rotating relative to each other. The support portion of each joint is connected to the flexible connection member; the flexible connection member is extended as the joints are opened or closed as the joints are closed.

20 Claims, 5 Drawing Sheets

(58) Field of Classification Search
CPC .... G06F 1/1652; G06F 1/1681; G06F 1/1616; F16C 11/04; H05K 5/0226; H05K 5/0017; G09F 9/301; E05D 11/1028; E05D 7/00; E05D 3/06; E05Y 2900/606
See application file for complete search history.

(56) References Cited

U.S. PATENT DOCUMENTS

| | | | |
|---|---|---|---|
| 2016/0139634 A1* | 5/2016 | Cho | G06F 1/1652 16/366 |
| 2016/0299532 A1* | 10/2016 | Gheorghiu | E05D 11/0054 |
| 2016/0349802 A1 | 12/2016 | Ahn et al. | |
| 2016/0370829 A1 | 12/2016 | Hsu et al. | |
| 2017/0023987 A1 | 1/2017 | Wang | |
| 2017/0285688 A1 | 10/2017 | Sun | |
| 2018/0024590 A1* | 1/2018 | Nakamura | G06F 3/041 349/58 |
| 2018/0067519 A1* | 3/2018 | Tazbaz | E05D 11/10 |
| 2018/0092223 A1* | 3/2018 | Hsu | H04M 1/0268 |
| 2018/0275725 A1 | 9/2018 | Lin et al. | |
| 2021/0075895 A1 | 3/2021 | Cheng | |
| 2021/0084133 A1 | 3/2021 | Cheng et al. | |

FOREIGN PATENT DOCUMENTS

| | | |
|---|---|---|
| CN | 205596165 U | 9/2016 |
| CN | 205847338 U | 12/2016 |
| CN | 106455371 A | 2/2017 |
| CN | 205978043 U | 2/2017 |
| CN | 206309761 U | 7/2017 |
| CN | 206559426 U | 10/2017 |
| CN | 107437378 A | 12/2017 |
| CN | 207067960 U | 3/2018 |
| CN | 108712529 A | 10/2018 |
| CN | 108712530 A | 10/2018 |
| GB | 2521152 A | 6/2015 |
| KR | 20090021481 A | 3/2009 |
| WO | 2016/165519 A | 10/2016 |

OTHER PUBLICATIONS

International Search Report and Written Opinion issued in corresponding application No. PCT/CN2019/085989, dated Dec. 3, 2020.
IN Office Action in Application No. 202027055499 dated Sep. 16, 2021.
EP Search Report in Application No. 19806827.2 dated Jul. 16, 2021.
JP Office Action in Application No. 2020-565835 dated Nov. 22, 2021.
KR Office Action in Application No. 10-2021-080433108 dated Oct. 13, 2021.
KR Office Action in Application No. 10-2020-7036644 dated Oct. 13, 2021.

* cited by examiner

HINGE AND MOBILE TERMINAL

CROSS-REFERENCE TO RELATED APPLICATION

This application is a continuation application of International Application No. PCT/CN2019/085989 filed on May 8, 2019, which claims the priority of Chinese Application No. 201810510404.3, filed on May 24, 2018, which is incorporated herein by reference in its entirety.

TECHNICAL FIELD

The present disclosure relates to the field of communications technology, and in particular to a hinge and a mobile terminal.

BACKGROUND

With the development of communications technology, functions of mobile terminals are becoming more and more powerful, and the application of flexible screens is becoming increasingly popular. A hinge that supports bending of the flexible screen and the like is generally composed of various parts. One end surface of the hinge is attached to a non-display surface corresponding to a bendable portion of the flexible screen, and the other end surface of the hinge supports bending of the bendable portion of the flexible screen. The hinge that supports bending in the related art has a complicated structure and various types of parts, which are difficult to process and assemble.

It can be seen that the hinge in the related art has a technical problem that various types of parts make it difficult to process and assemble.

SUMMARY

Embodiments of the present disclosure provide a hinge and a mobile terminal, to solve the technical problem that the hinge in the related art has various types of parts, resulting in difficulty in processing and assembling.

In order to achieve the above purpose, specific solutions provided by some embodiments of the present disclosure are as follows.

According to a first aspect, some embodiments of the present disclosure provide a hinge, including: at least two joints that are sequentially connected;

wherein each joint includes a joint body, a rotation structure provided at a first end portion of the joint body and a support portion provided at a second end portion of the joint body; the first end portion and the second end portion are oppositely disposed;

the rotation structures of any adjacent two joints are socketed with each other; the rotation structures of adjacent two joints are capable of rotating relative to each other;

the hinge further includes a flexible connection member, and the support portion of each joint is connected to the flexible connection member; the flexible connection member is extended as the joints are opened or closed as the joints are closed.

According to a second aspect, some embodiments of the present disclosure provide a mobile terminal, including: a flexible screen; and the hinge according to the first aspect.

The flexible screen includes a display surface and a non-display surface opposite to each other;

the rotation structures of at least two joints of the hinge are connected in sequence to form a fitting surface; the fitting surface is attached to the non-display surface at a position corresponding to a bendable portion of the flexible screen;

the support portions of at least two joints of the hinge are connected to the flexible connection member to form a supporting surface; the supporting surface supports the non-display surface of the flexible screen.

In some embodiments of the present disclosure, the hinge includes at least two joints of the same structure that are connected in sequence, and the rotation structures of any two adjacent joints are socketed with each other so that the rotation structures of the adjacent two joints are relatively rotated. The presence of the flexible connection member, which can open or close with the opening or closing of joints, can limit the opening degree of the adjacent two joints. In this way, the joints forming the hinge have the same structure, which is convenient for processing and assembling. A length of the hinge may be changed by increasing or decreasing the number of joints, which optimizes the assembly scheme of the hinge.

BRIEF DESCRIPTION OF THE DRAWINGS

To better clarify technical solutions of embodiments of the present disclosure, drawings used in description of the embodiments of the present disclosure are briefly introduced hereinafter. Apparently, the described drawings merely illustrate some of the embodiments set forth in the present disclosure. A person of ordinary skill in the art can obtain other drawings based on the described drawings without paying creative labor.

DETAILED DESCRIPTION

The technical solutions in embodiments of the present disclosure are described clearly and completely in conjunction with drawings in the embodiments of the present disclosure. Apparently, the described embodiments are merely a part of rather than all the embodiments of the present application. All other embodiments obtained by a person of ordinary skill in the art based on the embodiments of the present disclosure fall within the scope of the present disclosure.

Figure 1:
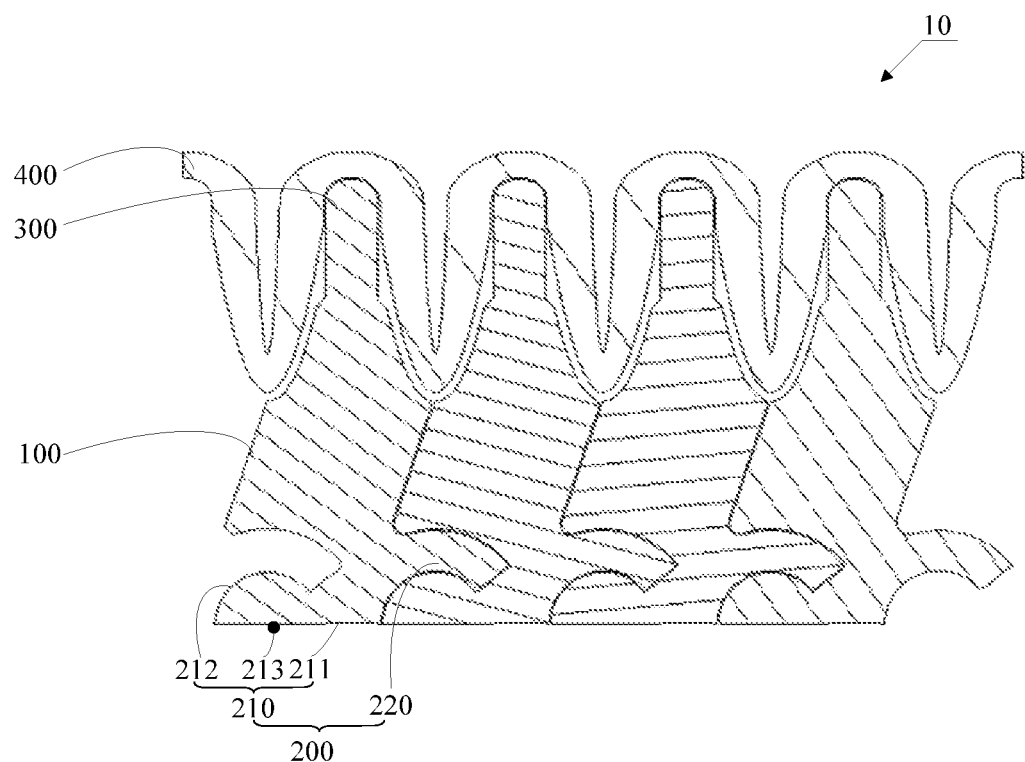
FIG. 1 is a schematic structural diagram of a hinge according to some embodiments of the present disclosure.
Figure 2:
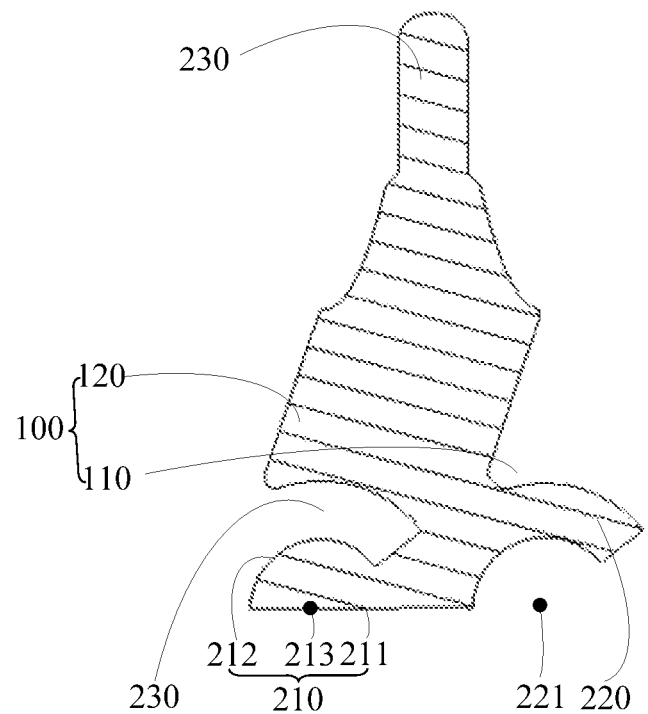
FIG. 2 is a schematic structural diagram of a joint of a hinge according to some embodiments of the present disclosure.

Referring to FIG. 1, FIG. 1 is a schematic structural diagram of a hinge according to some embodiments of the present disclosure. As shown in FIG. 1 and FIG. 2, a hinge 10 includes at least two joints 101, and the at least two joints 101 are sequentially connected.

Each joint 101 includes a joint body 100, a rotation structure 200 provided at a first end portion of the joint body 100, and a support portion 300 provided at a second end portion of the joint body 100. The first end portion and the second end portion are oppositely disposed.

The rotation structures 200 of any two adjacent joints are socketed with each other. The rotation structures 200 of adjacent two joints 101 are capable of rotating relative to each other to open or close the adjacent two joints 101.

The hinge 10 further includes a flexible connection member 400, and the support portion 300 of each joint is connected to the flexible connection member 400. The flexible connection member 400 can be extended as the joint is opened or closed as the joint is closed.

The hinge 10 according to some embodiments of the present disclosure includes at least two joints 101 that are connected in sequence, and structures of the at least two joints may be the same. The joint body 100 of each joint 101 is a main component of the joint. The joint body 100 includes the first end portion and the second end portion which are opposite to each other. One end of the joint body 100, which is attached to an attached component, is taken as the first end portion, and another end far from the first end portion is taken as the second end portion.

The rotation structure 200 provided at the first end portion of the joint body 100 is used to realize relative rotation between the joints. The support portion 300 provided at the second end portion of the joint body 100 is connected to the flexible connection member 400, to support and limit the relative rotation between the joints. Among at least two joints, the rotation structures 200 of any two adjacent joints are socketed with each other, and the support portions 300 of two adjacent joints drive the flexible connection member 400 to move and are also limited by the flexible connection member 400, thereby realizing opening or closing the adjacent two joints. Through the opening or closing of at least two joints in the hinge 10, the hinge 10 can provide the supporting effect on the attached component.

In some embodiments, as shown in FIG. 1, the hinge 10 may also be composed of at least three joints 101 which are sequentially connected. The joints 101 at two ends of the hinge 10 may be defined as a head joint 104 and a tail joint 105, respectively. One joint 101 between the head joint 104 and the tail joint 105 may be defined as a middle joint 106. The hinge 10 may include the head joint 104, the tail joint 105, and at least one middle joint 106. Structures of the at least one middle joint 106 may be completely the same. In addition to the rotation structure 200 that matches the adjacent joint 101 and the support portion 300, the head joint 104 and the tail joint 105 each may further include a connecting portion for connecting to the attached component.

The rotation structures 200 of any two adjacent joints are socketed with each other, so that the rotation structures 200 of two adjacent joints are relatively rotated. In this way, when the adjacent joints are relatively rotated with the rotation structures 200, the support portions 300 provided at the second end portions of the adjacent two joints and the connected flexible connection member 400 can also reciprocate relative, thereby achieving the opening or closing of the adjacent two joints. Since the support portion 300 provided at the second end portion of the joint is connected to the flexible connection member 400, the flexible connection member 400 can limit the opening degree of the adjacent two joints 101. When the opening degree of adjacent two joints reaches a preset value, the flexible connection member 400 limits excessive opening of adjacent two joints.

In the hinge provided in this embodiment, the rotation structures of any two adjacent joints are socketed with each other so that the rotation structures of the adjacent two joints are relatively rotated, and the opening degree of the adjacent two joints is limited within a preset range by the position-limit structure. In this way, the joints forming the hinge have the same structure, which is convenient for processing and assembling. A length and a bending degree of the hinge may be changed by increasing or decreasing the number of joints, which optimizes the assembly scheme of the hinge.

Based on the above embodiment, as shown in FIG. 1 to FIG. 4, the rotation structure 200 may include a rotation shaft 210 and an arc rotation bearing shell 220. An arc gap 230 is defined between the rotation shaft 210 and the joint body 100.

In any two adjacent joints 101, the rotation bearing shell 220 of a first joint is inserted into the arc gap 230 of a second joint, to be socketed with the rotation shaft 210 of the second joint. The rotation bearing shell 220 of the second joint can rotate relative to the rotation shaft 210 of the first joint.

When assembling the hinge 10 provided in this embodiment, adjacent two joints can be assembled together. Specifically, any two adjacent joints may be defined as a first joint and a second joint, respectively. Here, the description is only for any two adjacent joints, and is not specifically limited to a certain joint in the hinge 10. For example, when one joint is assembled with a front joint, the one joint may be defined as the second joint; and when the one joint is assembled with a rear joint, the one joint then may be defined as the first joint.

In the hinge 10 provided in this embodiment, the rotation structure 200 of each joint 101 includes a rotation shaft 210 and an arc rotation bearing shell 220. An arc gap 230 is defined between the rotation shaft 210 and the joint body 100 of each joint 101, and is used to accommodate the rotation bearing shell 220.

When the two adjacent joints 101 are assembled, the rotation bearing shell 220 of the first joint is inserted into the arc gap 230 of the second joint, so that the rotation bearing shell 220 of the first joint and the rotation shaft 210 of the second joint are socketed with each other, so that the rotation bearing shell 220 of the second joint is capable of rotating relative to the rotation shaft 210 of the first joint 102. In this way, the rotation bearing shell 220 of each joint 101 can be relatively rotated around the rotation shaft 210 of an adjacent joint 101; and the rotation shaft 210 of each joint 101 can be relatively rotated around the rotation bearing shell 220 of an adjacent joint 101. That is, the relative rotation of any two adjacent joints 101 in the hinge 10 is achieved.

Figure 3:
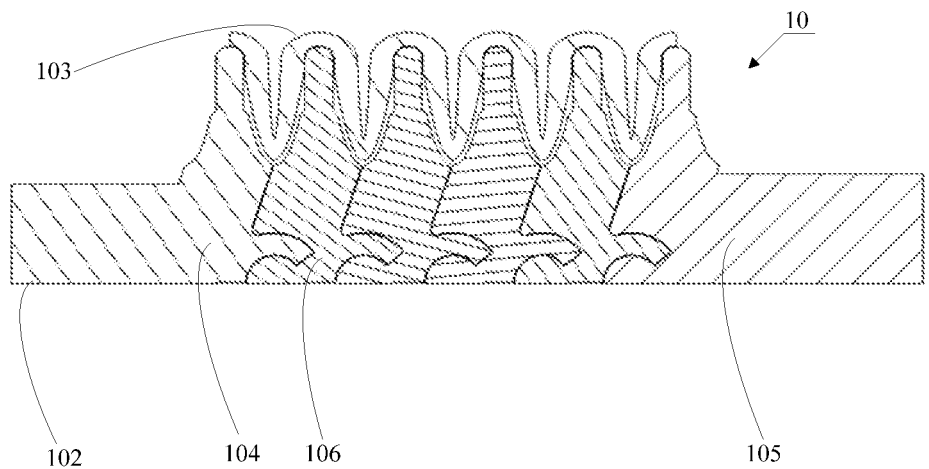
FIG. 3 is a schematic structural diagram of another hinge according to some embodiments of the present disclosure.
Figure 4:
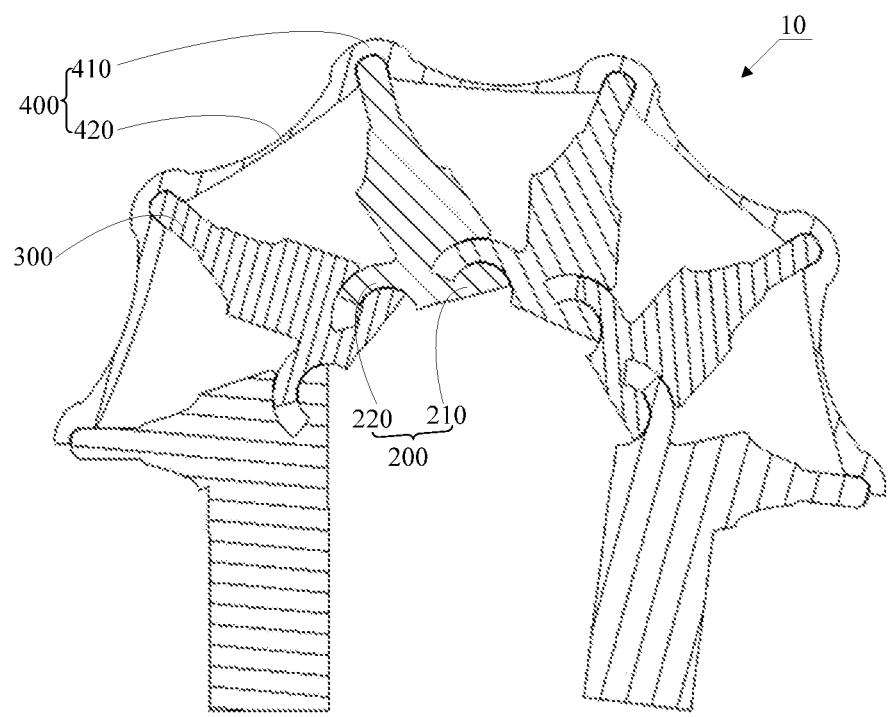
FIG. 4 is a schematic structural diagram of another hinge according to some embodiments of the present disclosure.
Figure 5:
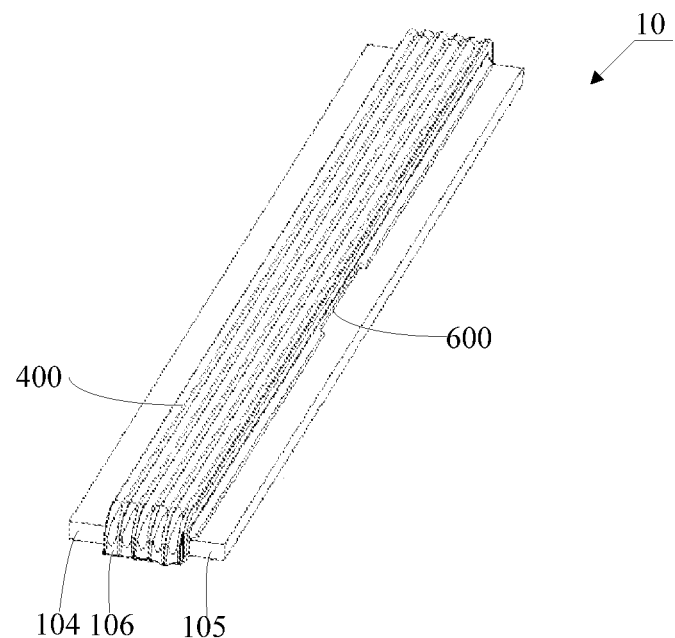
FIG. 5 is a schematic structural diagram of another hinge according to some embodiments of the present disclosure.

Based on the above embodiment, as shown in FIG. 1, FIG. 3 and FIG. 4, when any two adjacent joints 101 are in a closed state, lower surfaces of the rotation shafts 210 of each of the joints 101 define a horizontal fitting surface; and/or, when the at least two joints 101 are in an open state, the lower surfaces of the rotation shafts 210 of each of the joints 101 define an arc fitting surface.

In the hinge 10 provided in this embodiment, when any two adjacent joints 101 are rotated, the lower surfaces of the rotation shafts 210 of the joints 101 may be connected to form a horizontal surface or an arc surface as a fitting surface 102. By the fitting surface 102 which is formed by connected lower surfaces of the rotation shafts 210 of adjacent joints 101, the hinge 10 composed of at least two connected joints 101 may be straightened or bent.

In this embodiment, considering the manufacturing error of mechanical structures and the incomplete fit of rotation, the formed horizontal surface is substantially horizontal rather than a standard horizontal surface, and the formed arc surface is also substantially curved but not limited to a standard arc surface. When two adjacent joints 101 rotate relative to each other, each of the at least two joints 101 may not be located on a standard plane or a standard arc surface, as long as the lower surface of the rotation shaft 210 is maintained on a substantially horizontal surface or a substantially curved arc surface.

Specifically, according to different structures of the lower surfaces of the rotation shafts of each of the joints, the structure of the defined fitting surface is also varied.

First, if the lower surface of the rotation shaft of each joint is a horizontal plane, when at least two joints are closed, the lower surfaces of the rotation shafts of the at least two joints are connected to define a standard horizontal plane. When the at least two joints are opened, the lower surfaces of the rotation shafts of the at least two joints are connected to define an arc supporting surface. Since the lower surface of the rotation shaft of each joint is a horizontal plane and there may be an uneven connection between adjacent joints, the arc supporting surface formed by the connection of the lower surfaces of the rotation shafts of the at least two joints may be a non-standard arc surface.

Secondly, if the lower surface of the rotation shaft of each joint is an arc surface, when at least two joints are closed, a horizontal supporting surface formed by connection of the lower surfaces of the rotation shafts of the at least two joints may be a non-standard horizontal plane. When the at least two joints are opened, the lower surfaces of the rotation shafts of the at least two joints may be connected to form a standard arc supporting surface. Of course, a specific curvature and a bending type of the arc surface of the lower surface of the rotation shaft of the joint will also affect the curvature of the formed arc supporting surface, which is not limited here.

When the hinge 10 provided in this embodiment is used, the fitting surface 102 formed by connecting the lower surfaces of the rotation shafts 210 of at least two joints 101 is attached to the attached component, for example, being attached to a flexible screen. The support portions of at least two joints 101 and the flexible connection member are connected to form a supporting surface 103. The supporting surface 103 extends along with the fitting surface 102 to support the opening or closing of the fitting surface 102. The lower surface of the rotating shaft 210 is attached to a bendable portion of the attached component. As a surface of the bendable portion of the attached component is bent or extended, via opening or closing of the adjacent joints 101 of the hinge 10, the fitting surface 102 of the hinge 10 follows the bending or extension of the surface of the bendable portion of the attached component. During an attaching process of the fitting surface 102 of the hinge 10, a total length of the fitting surface 102 of the hinge 10 remains unchanged, and the fitting surface 102 is not easy to fold or generate unevenness, and then the fitting surface 102 will not cause crush damage to the surface of the bendable portion of the attached component. The flexible connection member 400 provided at the second end portions of the joints 101 supports and limits the movement of the support portions 300, thereby enabling the supporting surface 103 of the hinge 10 to shrink or stretch within a certain range, and then supporting shrinking or stretching of the fitting surface 102.

Based on the above embodiment, as shown in FIG. 1 to FIG. 5, the rotation shaft 210 may be a semi-circular rotation shaft 210, and a wrapping space of the rotation bearing shell 220 is matched with the rotation shaft 210.

In the hinge 10 provided in this embodiment, the rotation shaft 210 is a semi-circular rotation shaft 210. The semi-circular rotation shaft 210 includes a circular arc upper surface 212 and a horizontal lower surface 211. An axis 213 of the rotation shaft is located on the horizontal lower surface 211 of the rotation shaft 210. The arc gap 230 of the joint 101 is surrounded and defined by the circular arc upper surface 212 of the semi-circular rotation shaft 210 and the joint body 100, and is used to accommodate the rotation bearing shell 220 of the adjacent joint 101. The rotation bearing shell 220 of the joint 101 is also an approximately semi-circular structure. An engagement area of the rotation bearing shell 220 matches a shape of the circular arc upper surface of the semi-circular rotation shaft 210, and can just accommodate the semi-circular rotation shaft 210 of the adjacent joint 101. A virtual axis 221 of the rotation bearing shell is located on a lower surface of the semi-circular engagement area. The lower surface of the semi-circular engagement area and the lower surface where the virtual axis 221 of the rotation bearing shell is located, are coplanar. In other words, the virtual axis 221 of the rotation bearing shell 220 of the joint 101 is located on a plane where the lower surface of the rotation shaft of the joint is located. In this way, when any two adjacent joints 101 are assembled, the rotation bearing shell 220 of the first joint 102 is inserted into the arc gap 230 of the second joint 103, so that the rotation bearing shell 220 of the first joint 102 covers and fits the rotation shaft 210 of the second joint 103, thereby realizing relative rotation between the rotation bearing shell 220 of the first joint 102 and the rotation shaft 210 of the second joint 103. Since the virtual axis of the rotation bearing shell 220 of each joint 101 is on the lower surface of the rotation shaft 210 of each joint 101, when the two adjacent joints 101 are relatively rotated, the lower surfaces of the rotation axes 210 of the adjacent joints 101 are on the same horizontal plane or the same arc surface so that the fitting surface 102 of the hinge 10 can fit the surface of the bendable portion of the attached component.

Figure 6:
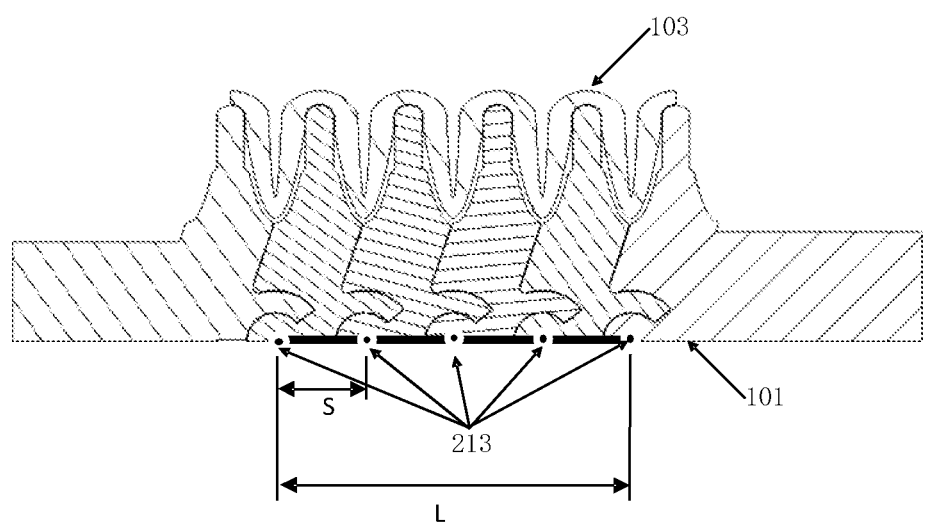
FIG. 6 is a schematic structural diagram of another hinge according to some embodiments of the present disclosure.
Figure 7:
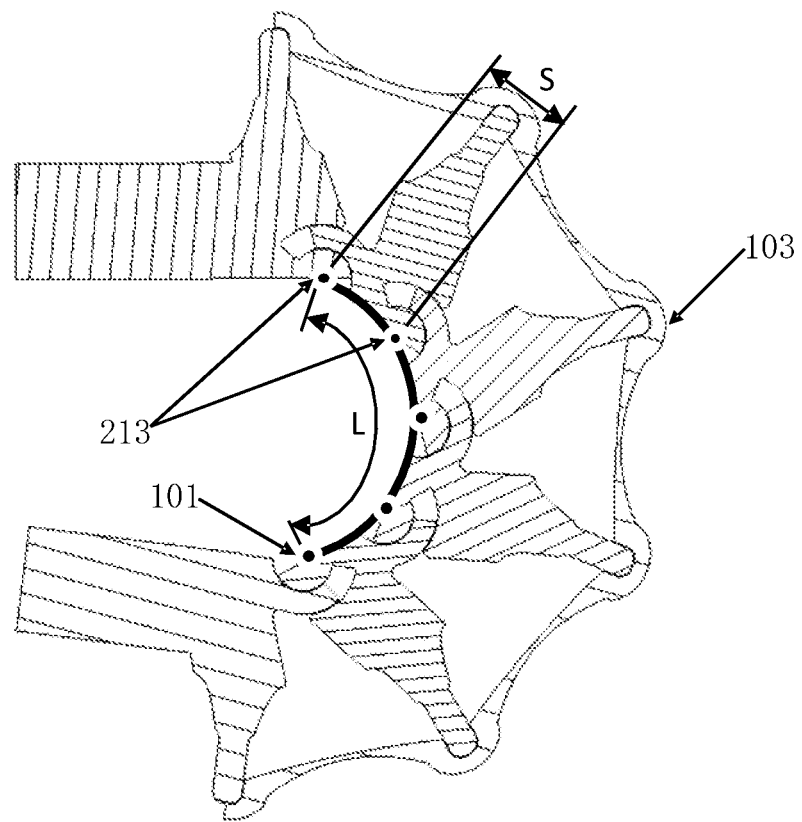
FIG. 7 is a schematic structural diagram of another hinge according to some embodiments of the present disclosure.

Based on the above embodiment, as shown in FIG. 6 and FIG. 7, the axes of the rotation shafts 210 of the at least two joints 101 are on the fitting surface 102 of the hinge 10. In this way, during rotation of the hinge 10, the total length of the fitting surface 102 of the hinge 10 may remain unchanged.

Specifically, it is assumed that a distance between virtual rotation centers is S, and the hinge 10 has n joints 101 in total. As shown in FIG. 6, when the hinge 10 is straightened, the total length of the fitting surface 102 of the hinge 10 is: $L=S*n$.

As shown in FIG. 7, when the hinge 10 is bent, since the distance S between the virtual rotation centers remains unchanged, and the total number of joints 101 remains unchanged, then, the total length of the fitting surface 102 of the hinge 10 is: $L=S*n$, that is, the total length of the fitting surface 102 when the hinge 10 is bent is consistent with the total length of the fitting surface 102 when the hinge 10 is straightened.

In this way, when the fitting surface 102 of the hinge 10 is attached to a flexible screen or other components, the total length of the fitting surface 102 remains unchanged, which can protect the attached component from being stretched or compressed, thereby improving fitting protection effect as well as supporting function of the hinge 10.

Based on the above embodiment, as shown in FIG. 1 to FIG. 5, two ends of the flexible connection member 400 are fixedly connected to end joints located at two ends of the at least two joints, respectively. Among the at least two joints, each joint between the two end joints moves along an inner surface of the flexible connection member 400.

In the hinge 10 provided in this embodiment, the flexible connection member 400 cooperates with the support portions 300 to limit the opening or closing of the joint, which is mainly achieved by the solution that the flexible connection member 400 is fixed to two ends of at least two joints. Specifically, one end of the flexible connection member 400 is fixedly connected to a corresponding end joint, and the other end of the flexible connection member 400 is fixedly connected to the other corresponding end joint. In this way, each middle joint 106 located between the two end joints of the at least two joints are all located in the flexible connection member 400, and the support portion 300 of each middle joint 106 is in contact with the inner surface of the flexible connection member 400.

In this way, when any two joints of at least two joints are brought closer together, the two end joints are brought closer together, and then the two ends of the flexible connection member 400 are also brought closer together. Any adjacent two joints move closer as the rotation structures 200 rotate, and the support portions 300 on any two adjacent joints also close and come into close contact with the flexible connection member 400.

When any two adjacent joints of at least two joints are opened, the two end joints are moved away from each other, and the two ends of the flexible connection member 400 are also moved away from each other. Any adjacent two joints are moved away from each other as the rotation of the joints, and the adjacent two joints move along the inner surface of the flexible connection member 400.

In the hinge 10 provided in this embodiment, the end joints at two ends of the hinge 10 are fixed to the flexible connection member 400, and the joints between the two ends can move along the inner surface of the flexible connection member 400, thereby effectively realizing the opening or closing of the joins via engagement between at least two joints of the hinge 10 and the flexible connection member 400.

Based on the above embodiment, as shown in FIG. 1, the flexible connection member 400 may include at least two supporting members 410 and a flexible connecting band 420 connecting any two adjacent supporting members 410. The support portion 300 and the supporting member 410 are connected.

In this embodiment, the flexible connection member 400 of the hinge 10 includes at least two supporting members 410, and any two adjacent supporting members 410 are connected by the flexible connecting band 420. Each supporting member 410 of the flexible connection member 400 is corresponding to the support portion 300 of one joint. Any two adjacent joints are connected to corresponding two adjacent supporting members 410. The flexible connecting band 420 between two adjacent supporting members 410 supports and limits the opening or closing between the adjacent two joints.

In a specific embodiment, as shown in FIG. 3 and FIG. 4, each of the supporting members 410 is provided with a groove 110 matching the support portion 300. The support portion 300 extends into the groove 110, thereby realizing the connection between the support portion 300 and the supporting member 410.

The flexible connection member 400 of the hinge 10 is provided with at least two supporting members 410, each supporting member 410 is provided with a groove 110, and the groove 110 matches the support portion 300 of the joint. That is, the support portion 300 of each joint may be inserted into one groove 110 of the flexible connection member 400. The support portion 300 of each of the at least two joints of the hinge 10 is inserted into one groove 110 of the flexible connection member 400, thereby realizing connection of the support portion 300 of the joint and the flexible connection member 400. The flexible connecting band 420 provided between any two adjacent grooves 110 can effectively limit the opening or closing of the support portions 300 of corresponding two adjacent joints.

Based on the above embodiment, as shown in FIG. 3 and FIG. 4, when any adjacent two joints are closed, an outer surface of a flexible connection member sleeved on the support portion 300 of each joint forms a horizontal supporting surface; and/or when at least two joints are opened, the outer surface of the flexible connection member connected to the support portion 300 of each joint forms an arc supporting surface.

In the hinge 10 provided in this embodiment, considering that when the hinge 10 is attached, the lower surfaces of the rotation shafts 210 of each of the joints 101 are located on the same horizontal plane or the same arc surface, in order to ensure fitting integrity and supporting effect of the hinge 10, the supporting surface 103 formed by the connection of the support portion 300 of each joint and the flexible connection member 400 is consistent with the fitting surface 102 formed by the connection of the rotation structures 200.

That is, when any adjacent two joints 101 are closed, the support portion 300 of each joint 101 supports the flexible connection member 400 to form a horizontal supporting surface, or when at least two joints 101 are opened, the support portion of each joint 101 300 supports the flexible connection member 400 to form an arc supporting surface.

Based on the above embodiment, as shown in FIGS. 1 to 7, the joint body 100 of each joint 101 may include an accommodation groove 110 and a projection 120 disposed opposite to each other.

When any two adjacent joints 101 are in a closed state, the projection 120 of the first joint 102 fits into the accommodation groove 110 of the second joint 103.

In the hinge 10 provided in this embodiment, in order to further improve a fitting degree of the adjacent two joints 101 during the opening and closing process, the joint bodies 100 of the adjacent two joints 101 are set to as mutually matched structures. Specifically, the joint body 100 includes an accommodation groove 110 and a projection 120, the accommodation groove 110 and the projection 120 are disposed opposite to each other, and a surrounding space of the accommodation groove 110 matches the projection 120. When any two adjacent joints 101 are closed, the projection 120 of the first joint may fit into the accommodation groove 110 of the second joint, so that the first joint and the second joint are completely fitted. In this way, the adjacent two joints 101 have a higher fitting degree when they are closed, which can reduce a volume of the hinge 10 after the hinge 10 is closed and reduce a movable gap between the joints 101, thereby improving dust-proof performance, regularity and supporting performance of the hinge 10 after the hinge 10 is closed. In addition, when the joint body 100 is provided with the projection 120 and the accommodation groove 110 that match each other, this can save the manufacturing cost of the joint 101.

Based on the above embodiment, as shown in FIG. 3 and FIG. 4, for the head joint 104 and the tail joint 105 at two ends of at least two joints 101, the joint body 100 is strip-shaped. One end of the strip-shaped joint body 100 is socketed with the rotation structure 200 of an adjacent joint 101.

In the hinge 10 provided in this embodiment, the joints 101 at the two ends are defined as end joints, including the head joint 104 and the tail joint 105. The joint body 100 of the end joint is strip-shaped. The strip-shaped joint body 100 may include a joint connection end and a component connection end. The joint connection end is matched and connected with an adjacent middle joint 106. The component connection end is connected with the attached component or an accessory component of the attached component.

In a specific embodiment, the joint connection end may include the rotation structure 200 and the support portion 300, for matching and connecting with an adjacent middle joint 106. The rotation shaft 210 and the arc gap 230 may only be set at a position where the joint connection end connects the rotation bearing shell 220 of the adjacent joint 101. The support portion 300 may be set at a position where the joint connection end connects the adjacent joint 101. The rotation bearing shell 220 of one middle joint 106 adjacent the joint connection end of the end joint is inserted into the arc gap 230 of the end joint. The component connection end of the end joint is connected with the attached component or an accessory component of the attached component via a screw, an adhesive layer, or the like. In this way, the end joint can not only be matched and connected with the middle joint 106, but also fix the hinge 10 to the attached component. The joints 101 included in the hinge 10 have the same structure, which is convenient for production and processing.

Figure 8:
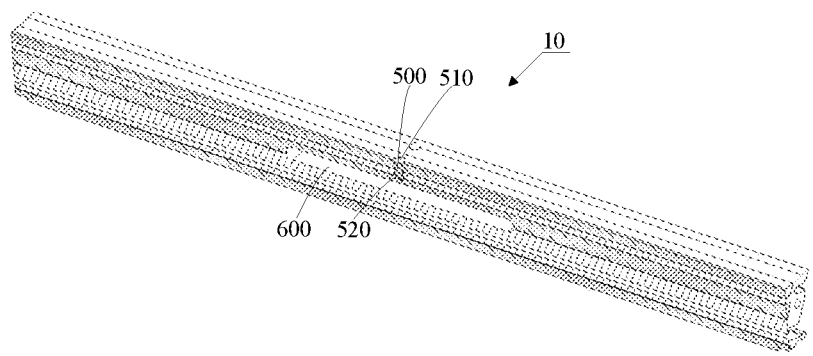
FIG. 8 is a schematic structural diagram of another hinge according to some embodiments of the present disclosure.
Figure 9:
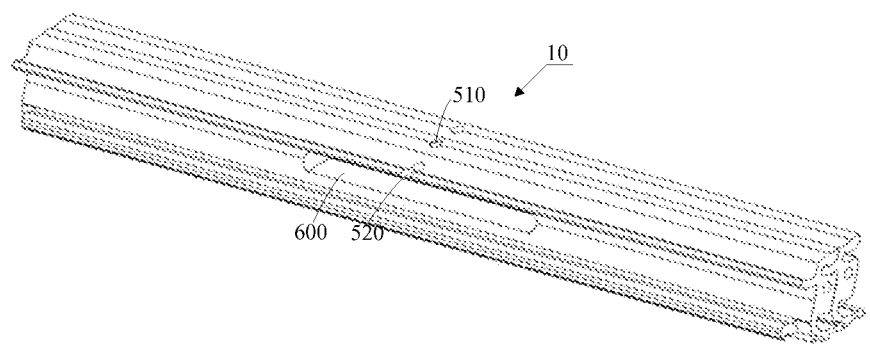
FIG. 9 is a schematic structural diagram of another hinge according to some embodiments of the present disclosure.

Based on the above embodiment, as shown in FIG. 8 and FIG. 9, a position-limit member 500 may be further provided between any adjacent joints. The position-limit member 500 can limit relative sliding between adjacent joints along an axial direction of the rotation shaft 210.

In the hinge 10 provided in this embodiment, the relative rotation of the adjacent joints 101 in a radial direction of the rotation shaft 210 realizes extension or bending of the hinge 10. At this point, at least two joints 101 in the hinge 10 are maintained in a relatively fixed state in the axial direction of the rotation shaft 210, thereby ensuring a stable connection between the adjacent joints 101. In order to prevent the relative sliding of the joints 101 in the axial direction to affect the connection stability between the joints 101, the presence of the position-limit member 500 between adjacent joints 101 can limit relative sliding between adjacent two joints 101 along the axial direction of the rotation shaft 210.

In a specific embodiment, as shown in FIG. 8 and FIG. 9, the position-limit member 500 is a pin. Among adjacent joints 101, the first joint is provided with a shaft hole 510, and the second joint is provided with an axial position-limit groove 520 at a position corresponding to the shaft hole 510.

The pin extends through the shaft hole 510 in the first joint into the axial position-limit groove 520 of the second joint. The axial position-limit groove 520 can limit movement of the pin along the axial direction of the rotation shaft 510.

There is an overlapping area of any adjacent two joints 101. The shaft hole 510 is defined in the first joint at a position corresponding to the overlapping area. The axial position-limit groove 520 is defined in the second joint at a position corresponding to the overlapping area. The shaft hole 510 in the first joint is in communication with the axial position-limit groove 520 in the second joint. Such communication may be achieved through direct contact between the first joint and the second joint, or through a gap between the first joint and the second joint.

The axial position-limit groove 520 provided in the second joint has a narrow width in the axial direction of the rotation shaft 210, and the width may be equal to or slightly larger than a diameter of the pin. The axial position-limit groove 520 extends along the radial direction of the rotation shaft 210, which allows the pin to move along the axial position-limit groove 520 during the opening and closing movement of the first joint and the second joint.

In the hinge 10 provided in this embodiment, when the two adjacent joints 101 are assembled, the pin extends through the shaft hole 510 of the first joint and then extends into the axial position-limit groove 520 of the second joint. In this way, when the adjacent joints 101 are opened or closed, along with rotation of the first joint, the pin slides along the radial direction of the rotation shaft 210 in the axial position-limit groove 520 of the second joint, thereby effectively limiting the axial sliding between the adjacent joints 101 and then ensuring the connection stability of the hinge 10.

Based on the above embodiment, as shown in FIG. 8 and FIG. 9, each joint 101 is provided with a wiring through-hole 600. The wiring through-holes 600 of any adjacent joints 101 are in communication with each other.

When the hinge 10 provided in this embodiment is applied to a mobile terminal such as a flexible screen, the wiring of the mobile terminal may be exposed, which may affect the aesthetics, or, the wiring of the mobile terminal may easily wrap with the hinge 10, which will affect the normal bending of the hinge 10. Thus, the wiring through-hole 600 is defined in the joint 101, and the wiring through holes 600 of any adjacent joints 101 can be communicated. In this way, the relevant wiring of the mobile terminal can sequentially extend through the wiring through hole 600 in each joint 101 of the hinge 10, and such internal wiring avoids the influence of external wiring on external components and aesthetics.

Based on the above embodiment, an end cap is covered on the first end portion of each joint 101.

In the hinge 10 provided in this embodiment, the end cap is provided at the first end portion of the joint 101, and the end cap is used to cover a connection portion of the adjacent joints 101, which can prevent the internal wiring from being exposed and affecting the appearance. Further, the end cap can prevent water and dust, thereby further improving the closing performance and rotation sensitivity of the hinge 10. The end cap may be made of a material such as a soft rubber. Other implementation schemes of the end cap that can cover the end portions of the joint 101 may be applied to this embodiment without limitation.

Figure 10:
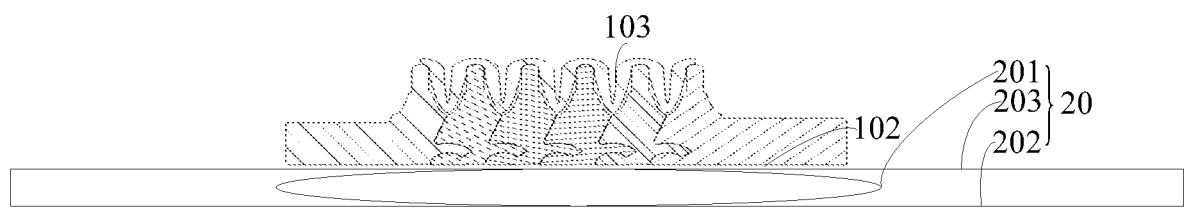
FIG. 10 is a schematic partial structural diagram of a mobile terminal according to some embodiments of the present disclosure.
Figure 11:
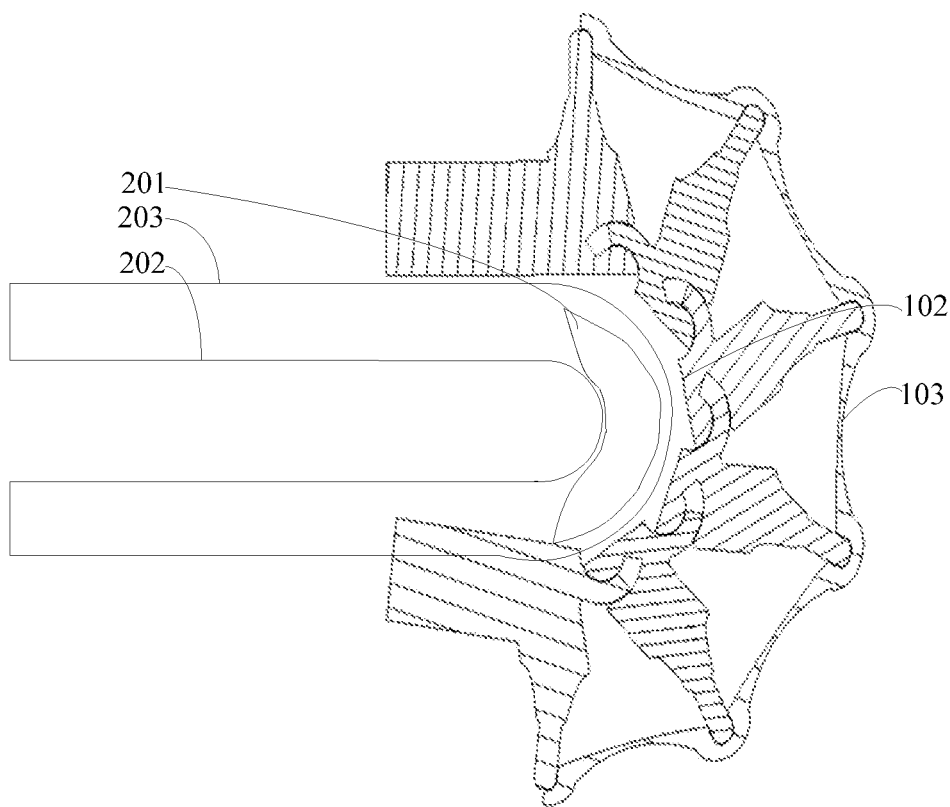
FIG. 11 is a schematic partial structural diagram of another mobile terminal according to some embodiments of the present disclosure.

Referring to FIG. 10 and FIG. 11, one embodiment of the present disclosure further provides a mobile terminal, including a flexible screen 20 and the hinge 10 shown in any one of FIG. 1 to FIG. 9. The flexible screen 20 includes a display surface 202 and a non-display surface 203 opposite to each other.

The rotation structures of at least two joints of the hinge 10 are connected in sequence to form a fitting surface 102. The fitting surface 102 is attached to the non-display surface 203 at a position corresponding to a bendable portion 201 of the flexible screen 20.

The support portions of at least two joints of the hinge 10 and the flexible connection member are connected to form a supporting surface 103. The supporting surface 103 is used to support the non-display surface 203 of the flexible screen 20.

As shown in FIG. 10, when any two adjacent joints are closed, the lower surfaces of the rotation shafts of each of the joints are located on the same horizontal plane, and thus the formed fitting surface 102 is a horizontal plane. The fitting surface 102 is attached to the non-display surface 203 of the flexible screen 20, and supports extension of the flexible screen.

As shown in FIG. 11, when at least two joints are opened, the lower surfaces of the rotation shafts of each of the joints define an arc fitting surface 102, and the support portions of the joints and the connection member are connected to form an arc supporting surface 103. In this way, when the lower surfaces of at least two joints of the hinge are connected to form an arc fitting surface 102, the flexible screen 20 can be smoothly curved in an arc shape as the hinge 10 is opened, so that an outer surface of the flexible screen 20 also forms a curved surface fitting with the arc fitting surface 102. When the lower surfaces of at least two joints of the hinge are connected to form a horizontal fitting surface 102, the flexible screen 20 can be straightened horizontally as the hinge 10 is closed, so that the outer surface of the flexible screen 20 also forms a horizontal surface fitting with the horizontal fitting surface 102.

In this way, the supporting surface 103 of the joints is stretched or bent along with the fitting surface 102, which can effectively support the fitting surface 102 to fit and support the non-display surface 203 at a position corresponding to the bendable portion 201 of the flexible screen 20, without limiting a bending state of the surface of the bendable portion.

The mobile terminal may include, but is not limited to, a mobile phone, a tablet computer, a notebook computer, a palmtop computer, a car terminal, a wearable device, and a pedometer, or any device with a flexible component that is bendable, especially a flexible screen attached with a hinge, which is not limited.

In the mobile terminal provided in this embodiment, the hinge used to fit the flexible screen includes at least two joints of the same structure that are connected in sequence, and the rotation structures of any two adjacent joints are socketed with each other so that the rotation structures of the adjacent two joints are relatively rotated. The presence of the flexible connection member, which can open or close with the opening or closing of joints, can limit the opening degree of the adjacent two joints. In this way, the joints forming the hinge have the same structure, which is convenient for processing and assembling. A length of the hinge may be changed by increasing or decreasing the number of joints, which optimizes the assembly scheme of the hinge. The specific implementation process of the mobile terminal provided in the embodiment of the present disclosure may refer to the specific implementation process of the hinge provided in the above embodiment, which will not be repeated here.

The above are merely the optional embodiments of the present disclosure and shall not be used to limit the scope of the present disclosure. A person skilled in the art may make improvements and modifications without departing from the principle of the present disclosure, and these improvements and modifications shall also fall within the scope of the present disclosure. Therefore, the protection scope of the present disclosure should be determined by the scope of the claims.

What is claimed is:

1. A hinge, comprising:
    at least two joints that are sequentially connected;
    wherein each joint comprises a joint body, a rotation structure provided at a first end portion of the joint body and a support portion provided at a second end portion of the joint body; the first end portion and the second end portion are oppositely disposed;
    the rotation structures of any adjacent two joints are socketed with each other; the rotation structures of adjacent two joints are capable of rotating relative to each other;
    wherein the rotation structure comprises a rotation shaft, and lower surfaces of the rotation shafts of the any adjacent two joints are connected to define a fitting surface;
    the hinge further comprises a flexible connection member, and the support portion of each joint is connected to the flexible connection member; the flexible connection member is extended as the joints are opened or closed as the joints are closed.

2. The hinge according to claim 1, wherein two ends of the flexible connection member are fixedly connected to end joints located at two ends of the at least two joints, respectively; among the at least two joints, each joint between the two end joints moves along an inner surface of the flexible connection member.

3. The hinge according to claim 2, wherein the flexible connection member comprises at least two supporting members and a flexible connecting band connecting any two adjacent supporting members; the support portion and the supporting member are connected.

4. The hinge according to claim 3, wherein each supporting member is provided with a groove matching the support portion; the support portion extends into the groove.

5. The hinge according to claim 1, wherein the rotation structure further comprises an arc rotation bearing shell, and an arc gap is defined between the rotation shaft and the joint body;
    in any two adjacent joints, the rotation bearing shell of a first joint is inserted into the gap of a second joint, and the rotation shaft of the second joint is rotatable relative to the rotation bearing shell of the first joint.

6. The hinge according to claim 5, wherein the rotation shaft is a semi-circular rotation shaft, and a wrapping space of the rotation bearing shell is matched with the rotation shaft.

7. The hinge according to claim 6, wherein when any adjacent two joints are in a closed state, lower surfaces of the rotation shafts of each of the joints define a horizontal fitting surface; and/or,
    when the at least two joints are in an open state, the lower surfaces of the rotation shafts of each of the joints define an arc fitting surface.

8. The hinge according to claim 7, wherein the joint body of each joint comprises an accommodation groove and a projection disposed opposite to each other;
    when any two adjacent joints are in a closed state, the projection of the first joint fits into the accommodation groove of the second joint.

9. The hinge according to claim 8, wherein a position-limit member is provided between any adjacent joints; the position-limit member limits relative sliding between the adjacent joints along an axial direction of the rotation shaft.

10. The hinge according to claim 9, wherein the position-limit member is a pin; in any two adjacent joints, the first joint is provided with a shaft hole, and the second joint is provided with an axial position-limit groove at a position corresponding to the shaft hole;

wherein the pin extends through the shaft hole in the first joint into the axial position-limit groove of the second joint, and the axial position-limit groove limits movement of the pin along the axial direction of the rotation shaft.

11. The hinge according to claim 1, wherein a wiring through-hole is defined in each joint; and the wiring through-holes of any adjacent joints are in communication with each other.

12. The hinge according to claim 2, wherein the joint body of each of end joint is strip-shaped; one end of the strip-shaped joint body is socketed with the rotation structure of one adjacent joint.

13. A mobile terminal, comprising:

a flexible screen; and a hinge; wherein the hinge comprises:

at least two joints that are sequentially connected;

wherein each joint comprises a joint body, a rotation structure provided at a first end portion of the joint body and a support portion provided at a second end portion of the joint body; the first end portion and the second end portion are oppositely disposed;

the rotation structures of any adjacent two joints are socketed with each other; the rotation structures of adjacent two joints are capable of rotating relative to each other;

wherein the rotation structure comprises a rotation shaft, and lower surfaces of the rotation shafts of the any adjacent two joints are connected to define a fitting surface;

the hinge further comprises a flexible connection member, and the support portion of each joint is connected to the flexible connection member; the flexible connection member is extended as the joints are opened or closed as the joints are closed;

wherein the flexible screen comprises a display surface and a non-display surface opposite to each other;

the fitting surface is directly attached to the non-display surface at a position corresponding to a bendable portion of the flexible screen;

the support portions of at least two joints of the hinge are connected to the flexible connection member to form a supporting surface; the supporting surface supports the non-display surface of the flexible screen.

14. The mobile terminal according to claim 13, wherein two ends of the flexible connection member are fixedly connected to end joints located at two ends of the at least two joints, respectively; among the at least two joints, each joint between the two end joints moves along an inner surface of the flexible connection member.

15. The mobile terminal according to claim 14, wherein the flexible connection member comprises at least two supporting members and a flexible connecting band connecting any two adjacent supporting members; the support portion and the supporting member are connected;

wherein each supporting member is provided with a groove matching the support portion; the support portion extends into the groove.

16. The mobile terminal according to claim 13, wherein the rotation structure comprises a rotation shaft and an arc rotation bearing shell, and an arc gap is defined between the rotation shaft and the joint body;

in any two adjacent joints, the rotation bearing shell of a first joint is inserted into the gap of a second joint, and the rotation shaft of the second joint is rotatable relative to the rotation bearing shell of the first joint;

wherein the rotation shaft is a semi-circular rotation shaft, and a wrapping space of the rotation bearing shell is matched with the rotation shaft.

17. The mobile terminal according to claim 16, wherein when any adjacent two joints are in a closed state, lower surfaces of the rotation shafts of each of the joints define a horizontal fitting surface; and/or, when the at least two joints are in an open state, the lower surfaces of the rotation shafts of each of the joints define an arc fitting surface.

18. The mobile terminal according to claim 17, wherein the joint body of each joint comprises an accommodation groove and a projection disposed opposite to each other;

when any two adjacent joints are in a closed state, the projection of the first joint fits into the accommodation groove of the second joint.

19. The hinge according to claim 11, wherein the wiring through-hole extends through the joint body of each joint, and is between the rotation structure and the support portion of each joint.

20. The mobile terminal according to claim 13, wherein the at least two joints of the hinge are in direct contact with the non-display surface at the position corresponding to the bendable portion of the flexible screen.

* * * * *